United States Patent
Naubereit et al.

[15] 3,688,202

[45] Aug. 29, 1972

[54] SIGNAL COMPARATOR SYSTEM

[72] Inventors: Henry Naubereit, Browns Mill, N.J.; Salvatore A. Picard, Hatboro, Pa.

[73] Assignee: The United States of America as represented by the Secretary of the Navy

[22] Filed: Aug. 10, 1970

[21] Appl. No.: 62,694

Related U.S. Application Data

[62] Division of Ser. No. 716,155, March 28, 1968, Pat. No. 3,550,015, which is a division of Ser. No. 600,660, Dec. 9, 1966, Pat. No. 3,383,619.

[52] U.S. Cl. ..................328/133, 328/134, 307/232, 307/233

[51] Int. Cl. ............................................H03d 13/00

[58] Field of Search .......307/232, 233; 328/133, 134

[56] References Cited

UNITED STATES PATENTS

| | | | |
|---|---|---|---|
| 2,985,773 | 5/1961 | Dobbie | 328/133 X |
| 3,430,148 | 2/1969 | Miki | 307/232 X |
| 3,482,132 | 12/1969 | Emde | 328/133 X |

*Primary Examiner*—John S. Heyman
*Attorney*—G. J. Rubens and Henry Hansen

[57] ABSTRACT

A digitally controlled frequency generator is provided having a selectively variable output frequency with crystal controlled accuracy and stability. Should the desired output frequency drift, however, a phase comparator detects the drift and compares the phase thereof with a provided reference signal. The resultant error signal is then fed into the frequency generator to shift the frequency back to its original value. In addition, should it be desired to change the output frequency of the frequency generator, a new program is applied to a variable program counter which produces an electronic response representative of the new program. This response is sensed by both the phase comparator and an acquisition circuit, the acquisition circuit providing signals to the phase comparator to achieve a "lock-in" of the system at the new desired frequency.

7 Claims, 9 Drawing Figures

INVENTORS
HENRY NAUBEREIT
SALVATORE R. PICARD
BY
[signature]
ATTORNEY

INVENTORS
HENRY NAUBEREIT
SALVATORE R. PICARD
BY
[signature]
ATTORNEY

SIGNAL COMPARATOR SYSTEM

The invention described herein may be manufactured and used by or for the Government of the United States of America for governmental purposes without the payment of any royalties thereon or therefor.

The present invention relates to automatic frequency control systems and more particularly to a high speed digital control system for voltage controlled oscillators wherein very stable frequencies are provided over a wide range of frequencies by a single oscillator..

In the field of radio communications, several techniques have been employed to provide multi-channel operation. For example, servo controlled crystal turrets have been employed for remote control tuning of both transmitters and receivers. Such systems, however, require complex mechanical design construction for the control system and complex circuitry for large frequency spectrums, therefore system reliability is considerably reduced.

Frequency synthesizers have also been used to provide multi-channel operations; however, the reduction in the number of crystals required by the previous technique is offset by the complex circuitry needed to perform the synthesizing operation. Further, remote tuning of these devices suffer from similar disadvantages.

Accordingly, there is an urgent need for a device which will provide remote control of a multi-channel transmit-receive operation with no moving parts, simple circuitry, and a stable wide band frequency of operation.

The present invention contemplates a system wherein a wide range of output frequency signals of crystal accuracy are made available from a single voltage controlled oscillator.

Briefly, the present invention contemplates a system wherein the frequency of a voltage controlled oscillator is selectively variable over a wide frequency spectrum while maintaining a stability comparable to that of a crystal controlled reference frequency. Upon selecting a desired frequency, the output of the voltage controlled oscillator is divided down by a variable programmed counter. The new output frequency of the programmed counter is sensed with respect to a reference frequency by an acquisition circuit which automatically determines whether the new frequency is higher or lower than the reference frequency and causes a phase comparator to produce an error signal which is fed back to the voltage controlled oscillator for correcting the output frequency. As the frequency of the oscillator nears the desired frequency, the acquisition circuit automatically removes itself from the loop and allows the phase comparator to perform the final locking or fine tuning function.

To provide the operation above, the present invention utilizes a variable programmed counter employing a pulse subtraction concept rather than a pulse addition concept to achieve a frequency division. The pulse subtraction concept can be best understood after a brief discussion of the pulse addition concept. Binary counters employing feedback techniques to reduce a counter's scaling factor or division factor are well known. For example, at pages 330–334 of *Pulse and Digital Techniques*, Millman and Taub, 1956 edition, such a feedback technique is illustrated. These techniques add a pulse to the previous counter stage to reduce the count of that stage and hence the total count of the counter. This technique accordingly requires the binary stage to have a frequency response high enough to respond to the additional count. Therefore, the repetition rate or frequency of the input pulse train must be below the frequency or response time of the binary stage by an amount sufficient to enable it to respond to the additional pulse. Such a technique imposes serious limitations on system operation. Accordingly, to overcome this disadvantage, the present invention utilizes the pulse subtraction technique whereby, rather than adding a pulse to the binary stage, a pulse is subtracted from it, thereby allowing the input pulse train to appear at a rate equal to the maximum response of the particular binary stage. This approach not only provides higher operating counter frequencies, but also fully utilizes the capabilities of each binary stage.

Therefore, it is an object of the present invention to provide a digitally controlled frequency generator wherein the output frequency is selectable over a wide frequency spectrum with crystal controlled accuracy and stability.

Another object of the invention is to provide a frequency generator for use in radio communications systems wherein only a single crystal is required for multi-channel receiver operation with no moving parts or complex circuitry and wherein the size, weight and power requirements of the system are considerably reduced and the reliability thereof increased.

A further object of the invention is to provide an automatic frequency control system utilizing automatic slowing and frequency detection in the acquisition modes.

Still a further object is to provide a novel program counter which utilizes the full capability of monolythic integrated circuits for increased reliability while decreasing size, weight and power.

Another object of the invention is to provide an automatic frequency detection and acquisition circuit which performs the course tuning of the voltage controlled oscillator.

Still another object of the invention is to provide a novel three position electronic switch.

Yet another object of the invention is to provide a novel phase comparator which produces an output signal proportional to the phase difference between two input signals.

Other objects and many of the attendant advantages of this invention will be readily appreciated as the same becomes better understood by reference to the following detail description when considered in connection with the accompanying drawings wherein.

Figure 7A:
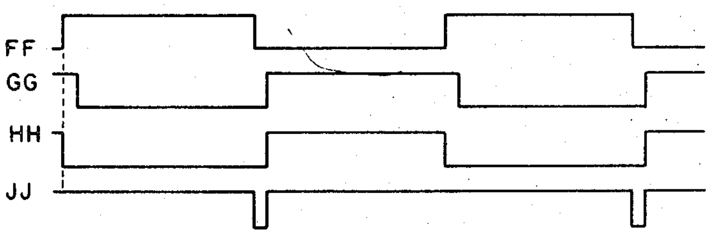
Figure 7B:
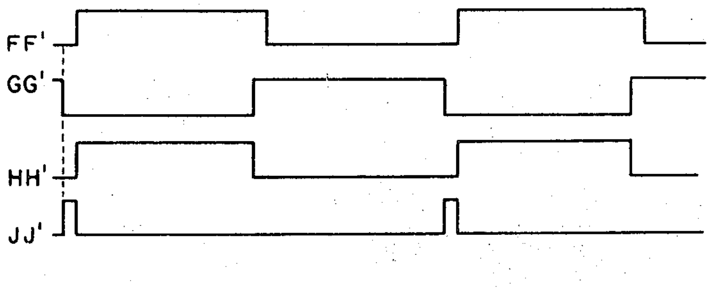
Figure 5:
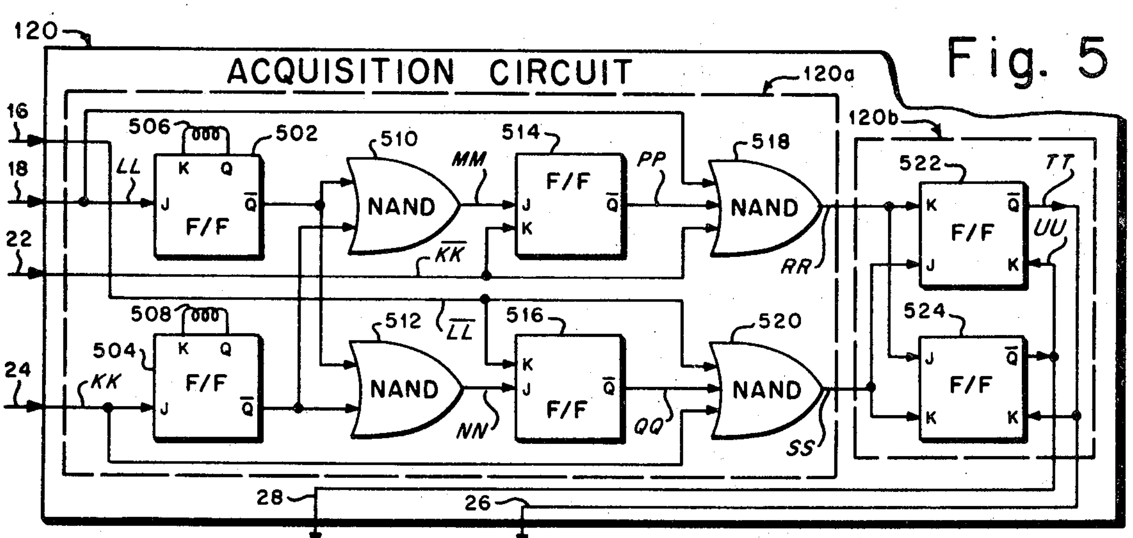
FIG. 5 is a logic diagram of an acquisition circuit of the present invention.
Figure 4:
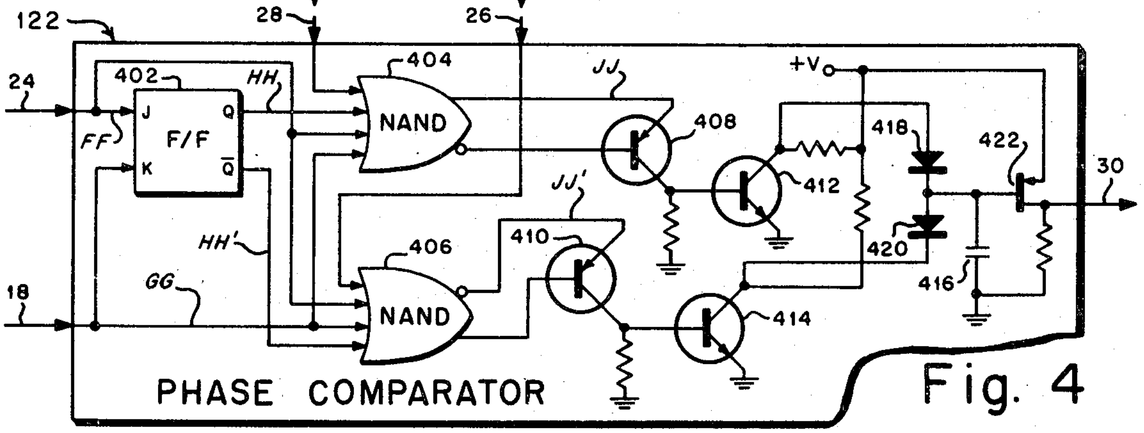
FIG. 4 is a logic and schematic diagram of a phase comparator of the present invention.
Figure 8:
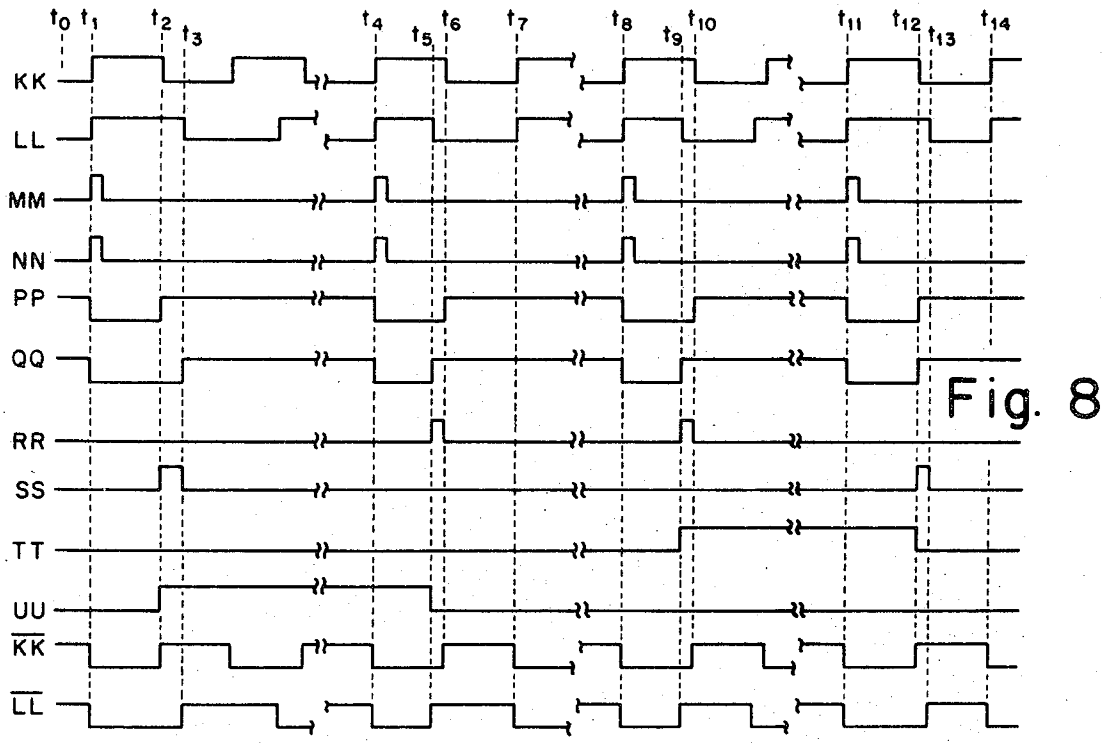

FIGS. 7*a* and 7*b* are a timing diagram of typical waveforms associated with the phase comparator of FIG. 4; and FIG. 8 is a timing diagram of typical waveforms associated with the acquisition circuit of FIG. 5.

Figure 1:
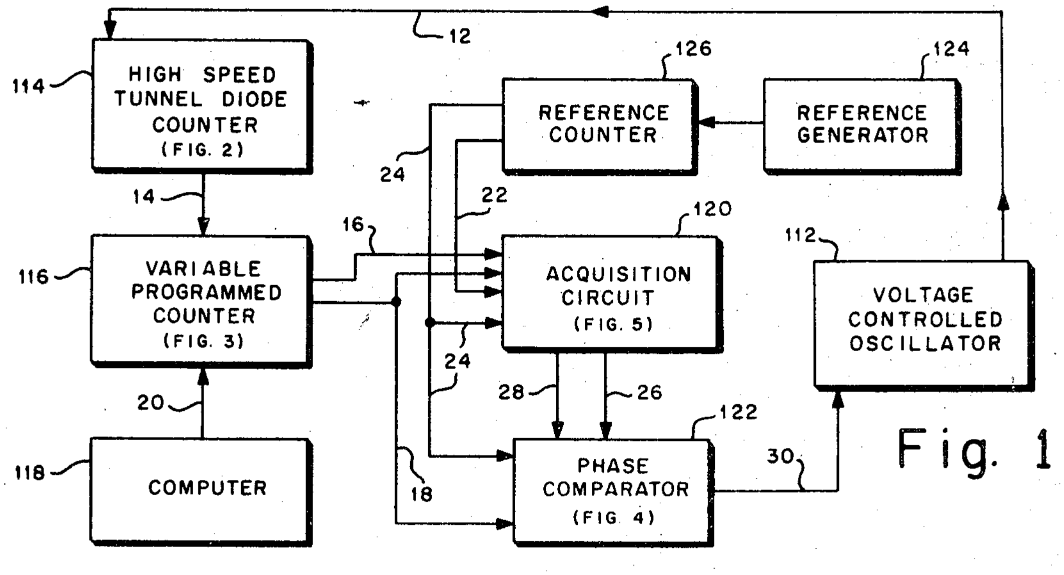
FIG. 1 illustrates in block diagram form one embodiment of the present invention.

Referring now to the drawing, FIG. 1 illustrates an embodiment of the invention in which a voltage controlled oscillator 112, well known to those skilled in the art, has a signal output connected to a high speed counter 114 through a conductor 12. The operation of the counter will be described later with reference to FIG. 2. The output of the voltage controlled oscillator (VCO) in a sine wave which is shaped and frequency divided by the high speed tunnel diode counter 114. The output of the fixed counter is then applied to a variable programmed counter 116 through a conductor 14. The counter, described in detail with reference to FIG. 3, performs another division function in accordance with pre-programmed information supplied from a computer 118. The computer may be simply a plurality of switches for applying either logic ones ("1" ) or zeros ("0") into the counter over conductors 20. The output of the variable program counter is a square wave of the same frequency as that of a reference signal, to be described hereinafter. The output signal from the programmed counter 116 and its complement are applied to an acquisition circuit 120 and a phase comparator 122 through conductors 16 and 18 respectively. The function of the acquisition circuit will be described with reference to FIG. 5. The phase comparator 122 described with reference to FIG. 4, makes a phase comparison between the output of the variable programmed counter 116 and a reference signal obtained from the output of a reference generator 124 frequency divided (by 32, for example) by a reference counter 126. The output of the reference counter is applied to the acquisition circuit 120 through a conductor 24 and to the phase comparator 122 through the conductor 24. The signals appearing on lines 18 and 24 are compared in the phase comparator 122 and a difference or error signal is generated and applied through a conductor 30 to the voltage controlled oscillator 112 as a correction or control signal. Conductors 26 and 28 supply lockout signals to the phase comparator 122 as will be described hereinafter.

The overall operation of the invention will now be described with reference to FIG. 1. Consider first that the closed loop system is in the locked condition; that is, the output frequency of the VCO is fixed and the control voltage applied thereto is constant. In this condition, the output frequency of the oscillator is also constant. This signal is shaped and frequency divided by the high speed counter 114 and then applied to the variable programmed counter 116 where it is further divided and then applied to the phase comparator 122 as a square wave. A signal derived from the reference generator 124 is frequency divided by reference counter 126 and is applied as a reference signal to the phase comparator. The two signals applied to the comparator are of the same frequency (as a result of appropriate frequency division in counters 114 and 116), and hence a phase comparison can be made. Since it was assumed that the system was locked, the phase difference is zero and the output is similarly zero, therefore, the output signal from the comparator does not vary the oscillator output frequency.

Consider now the situation where the output frequency of the oscillator drifts or varies as a result of a temperature change or supply voltage change. Since the frequency division is constantly being performed, the output frequency change from one division cycle to the next is very small and hence appears as a phase variation with respect to the reference signal. The comparator detects this phase difference and produces an error signal which shifts the frequency of the oscillator back to its original value. Thus the output frequency of the oscillator is maintained constant independent of circuit parameter variations. In the aforedescribed operation, the acquisition circuit 120 played no role in maintaining the output frequency constant, since it is only when a new discrete frequency is required of the VCO that the acquisition circuit 120 performs its function. This situation is best illustrated by the following example. Assume that it is desired to change the VCO output frequency. This is accomplished by changing the program of the variable programmed counter 116 such that a new division is achieved for the new frequency. This, in effect, breaks the "lock" of the system. Upon selecting the new program, the variable programmed counter 116 begins performing the new division required which is immediately sensed as a change, both by the phase comparator 122 and the acquisition circuit 120.

The acquisition circuit performs a frequency detection function and supplies a lock-out signal to the comparator on either lines 26 or 28 depending upon whether the input frequency from the programmed counter into the acquisition circuit is either higher or lower than the reference frequency appearing on lines 22 and 24. The lock-out signal from the acquisition circuit inhibits one-half of the phase comparator circuit so that the phase comparator provides an error signal to the oscillator of proper magnitude and polarity to change or slow its output in the direction of the newly selected frequency. As the oscillator output frequency approaches the desired frequency, the output frequency of the variable programmed counter 116 likewise approaches the reference frequency and hence comes within the "lock-in" range of the phase comparator 122. At this point, the acquisition circuit automatically removes itself (as will be described below) from the closed loop and allows the final locking operation to be performed by the phase comparator. The system is then held in lock as previously described.

Figure 2:
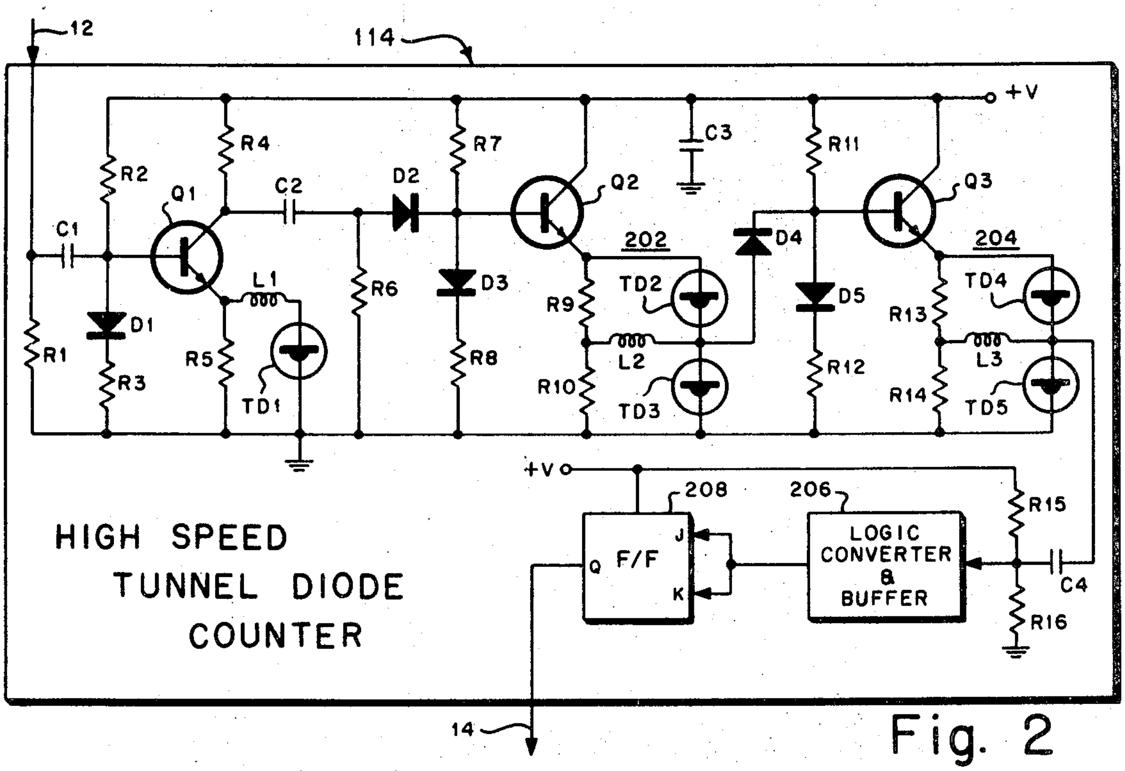
FIG. 2 is a schematic diagram of a high speed tunnel diode counter of the device.

Having thus described the basic operation of the invention reference is now made to FIG. 2 which discloses an embodiment of the high speed tunnel diode counter 114. The basic function of the counter is to receive the sinusoidal signal from the VCO and provide a square wave output signal which is a frequency division of the input signal. In particular, the high speed counter 114 is illustrated as being a divide by 16 counter; that is, four binary stages are serially arranged for the division function. Typical values for the high speed tunnel diode counter 114 are presented in Table 1 below, however, these values are merely considered illustrative of one embodiment and are not to be construed by way of limitation.

TABLE I

| Component | Value | Component | Value |
|---|---|---|---|
| R1 | 50 ohms | C1, C3 | .001 ufd. |

| | | | |
|---|---|---|---|
| R2 | 56K ohms | C2 | 10 uufd. |
| R3 | 1.8K ohms | C4 | 24 uufd. |
| R4, R5, R8, R12 | 1K ohms | L1 | .10 uh. |
| R6 | 620 ohms | L2 | .22 uh. |
| R7 | 24K ohms | L3 | .47 uh. |
| R9, R10, R13, R14 | 150 ohms | Q1, Q2 | 2N2857 |
| R11 | 22K ohms | Q3 | 2N918 |
| R15 | 1.3K ohms | D1 - D5 | 1N659A |
| R16 | 4.7K ohms | TD1 - TD5 | 1N3717 |

Assume that the output 12 of the VCO 112 entering the high speed counter 114 is of a frequency of 215 megacycles. This signal is capacitively coupled to a transistor Q1 which is normally biased ON. From the emitter of this transistor there is coupled through an inductor L1 a tunnel diode TD1 which is normally biased in the high voltage or ON state. The negative portion of the sinusoidal signal causes transistor Q1 to decrease conduction and thereby reduce the current through emitter resistor R5 and tunnel diode TD1. The inductor L1 attempts to prevent the decrease in current momentarily and after a short delay, the voltage reduces quickly and causes the tunnel diode to switch to its low voltage state. During this time delay, the input signal has gone positive and is on the negative slope of the sinusoid; hence the transistor Q1 is prevented from turning on again until after this event has occurred. As the sine wave again sweeps negative (during the second cycle), the transistor is again held off and only when the wave goes positive does the transistor conduct again. As it does so, the voltage across the tunnel diode TD1 is increased to the point where it switches to its high voltage level and remains there until the negative cycle of the sine wave, at which time the cycle repeats. In this way, the transistor Q1 and tunnel diode TD1 have performed a divide by two function.

The signal appearing at the collector of transistor Q1 is then 107.5 megacycles. The positive going portion of this signal is capacitively coupled from the collector of transistor Q1 through a biasing network to the base of a transistor Q2. This transistor is functioning as an emitter follower and voltage regulator driving a tunnel diode flip-flop 202 providing an output which is again a binary division of the input.

The binary stage 202 functions in the following manner: The voltage of the emitter of transistor Q2 is held constant by the base biasing network and adjusted to such a level that only one of the two tunnel diodes can be in the high voltage state at one time. The difference in tunnel diode biasing currents flows through the inductor. As the emitter of transistor Q2 is driven positive, the tunnel diode in the low voltage state is driven to the high voltage state and the reduced current flow through the inductor causes induced voltage therein which resets the other tunnel diode to the low voltage state. The result of this action is to cause a division of the signal appearing at the emitter of transistor Q2 by two.

The output of the flip-flop 202 is then coupled to another emitter follower Q3 which drives a tunnel diode flip-flop 204 similar to 202 for again dividing this signal by two. In this way, a sinusoidal signal applied to the base of transistor Q1 is divided by eight in three binary stages. The output of the tunnel diode flip-flop 204 is coupled to a buffer and logic converter 206 for converting the low level tunnel diode signals to higher logic levels for use in the variable programmed counter 116 to be described hereinafter. The output of the logic converter 206 is applied to a flip-flop 208 which again divides this signal by two.

The output of the high speed tunnel diode counter 114 is then a square wave signal having a frequency of 13.4375 megacycles. This signal is coupled to the first stage of the variable programmed counter 116 illustrated in FIG. 3.

Figure 3:
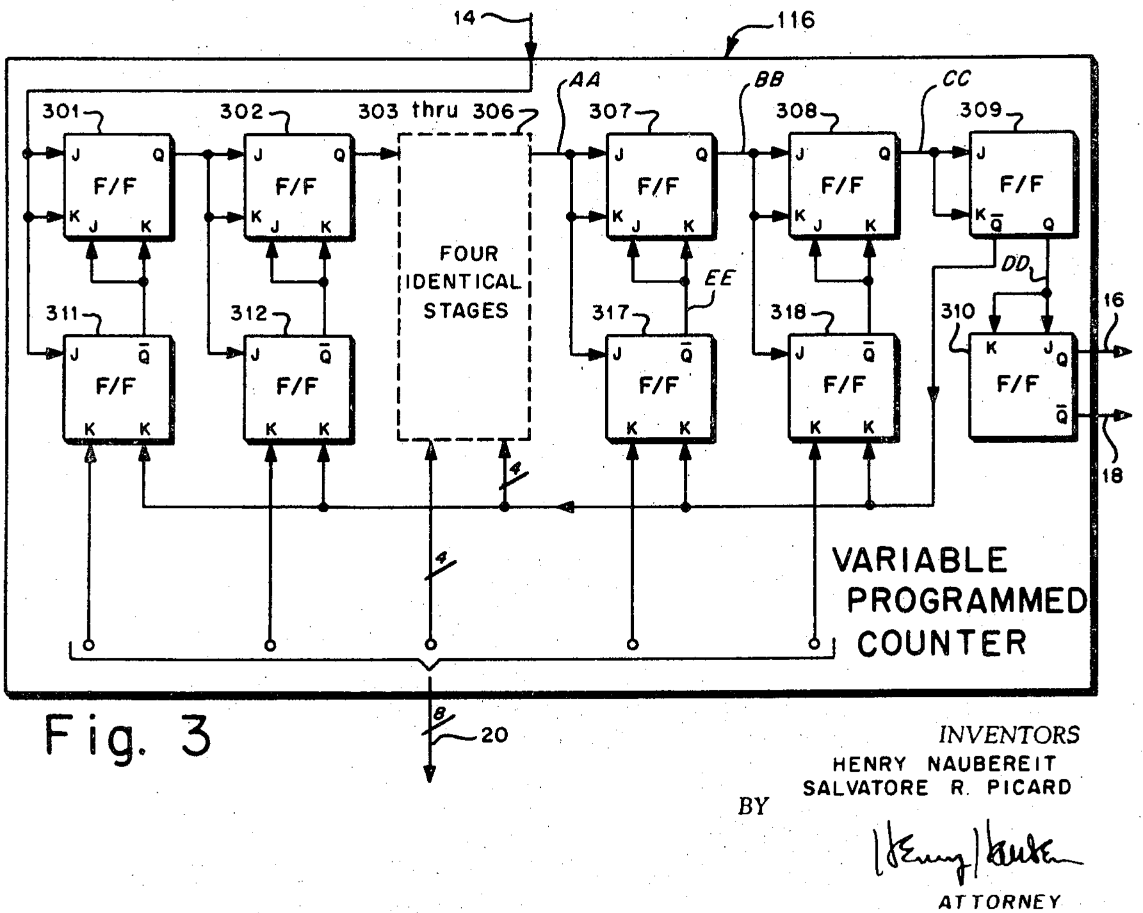
FIG. 3 is a logic diagram of a variable programmed counter of the present invention.

Referring now to FIG. 3, the variable programmed counter 116 is made up of a plurality of J-K flip-flops which may, for example, be the Motorola MECL series, type MC 308. The basic counter stages 301 through 309 are serially connected with the Q output of the preceding stage connected to one set of J-K inputs of the following stage. In addition to the basic counter stages, there are also a plurality of control counter stages 311 through 318. These stages are also J-K type flip-flops having their complementary Q output ($\overline{Q}$)connected to the second J-K input of one counter stage. Control counters 311 through 318 have a K input connected to receive a clock pulse from the $\overline{Q}$ output of stage 309 once in each counter cycle. Stages 311 through 318 have a K input connected to a computer 118 for supplying a selected code to these input lines. For example, the computer 118 can provide either a logic "1" or "0" and thereby control the $\overline{Q}$ output of flip-flops 311 through 318. The logical "1's" or "0's" could similarly be supplied by simple SPDT toggle switches in each control line with the logic "1" or "0" level supplied by an external voltage source. In either event, the variable programmed counter can be programmed in any desired combination so as to increase the basic division of the counter. The operation of the variable programmed counter can best be described by the following illustration.

With the initial application of power to the circuit, the logical states of flip-flops 301 through 309 are indeterminate. However, after a cycle or two, the flip-flops will orient themselves at "0's" or "1's". Accordingly, for purposes of illustration only, assume that each of the flip-flops 301 through 309 has a "0" at its Q output. Similarly, assume control stages 311 through 318 have a "0" at their $\overline{Q}$ output.

Figure 6:
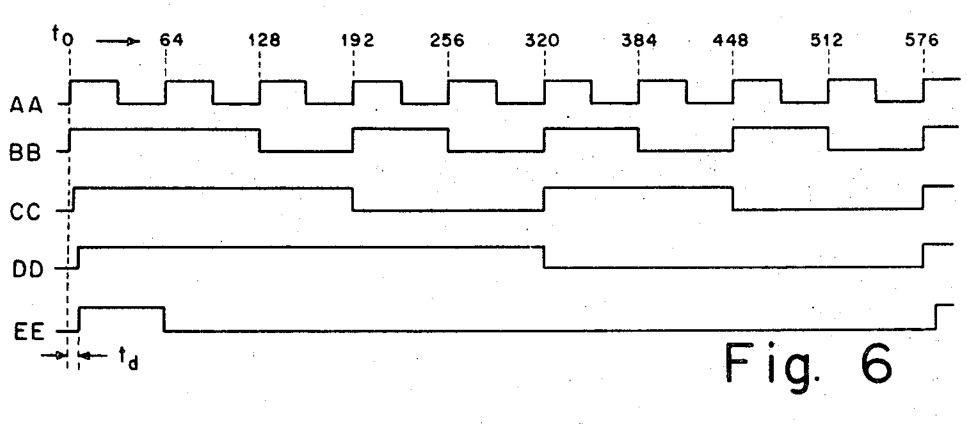
FIG. 6 is a timing diagram of typical waveforms associated with the variable programmed counter of FIG. 3.

In a normal ripple-through counter having nine stages it is possible to provide a maximum division of 512, and lesser amounts by typical feedback techniques well known to those skilled in the art. The counter described herein, however, provides a minimum count of 512 at the output of stage 309. The count may be increased by applying "0's" to any or all of the control stages 311 through 318. For purposes of illustration, assume that control counter 317 places a "1" at one set of J-K inputs of flip-flop 307 and that a square wave pulse train is applied on input conductor 14. As the pulse train is applied to counter stages 301, the output thereof is a division of the input frequency by two and the output of the succeeding stage 302 is a further division by two. This successive division by two continues through stage 306 whose output is illustrated in the timing diagram of FIG. 6 on line AA. As can be seen from this diagram, stage 306 passes through one complete cycle each 64 counts or cycles of the input pulse train as designated by $t_0$ + number of counts. As can be seen from FIG. 6, line BB, stage 307 is also enabled at $t_0$ and provides a "1" output. Normally, stage 307 would revert to the "0" state at $t_0 + 64$, however, since control stage 317 has a "1" applied to its K input, its $\bar{Q}$ output is a "1" as illustrated in line EE of FIG. 6. Consequently, the input pulse applied at $t_o + 64$ to counter stage 307 is ineffective in causing this stage to switch transitions. Therefore, stage 307 remains in its "1" condition from $t_o$ to $t_o$ to 128 as illustrated in FIG. 6. Control counter 317, however, receives the output of stage 306 and is driven to a "0" as illustrated in FIG. 6 on line EE. As the input pulse train continues and each of the stages 301 through 306 continue counting, at time $t_o + 128$, stage 306 again switches from its "0" to "1" state. At this time, however, control stage 317 is providing a "0" as an input to stage 307 and, accordingly, stage 307 is driven to its "0" state. The output remains at a "0" until the next complete cycle of the preceding stage 306, ($t_o + 192$), at which time stage 307 reverts to a "1." During this same instant, stage 308 (illustrated on line CC) is driven to a "0." This stage remains at a "0" until the next complete cycle of stage 307 ($t_o + 320$) at which time it reverts to a "1." At the same time, stage 309 (illustrated on line DD) is driven to a "0" state and remains there until stage 308 completes another cycle ($t_o + 576$) at which time stage 309 reverts to a "1."

By this technique then the programmed counter 116 has increased its count from a minimum of 512 to 576 merely by energizing control stage 317. By energizing other stages, the count could obviously be increased still further. For example, a count of 592 could be obtained by applying "0's" to stages 315 and 317. Similarly, a count of 610 can be obtained by applying "0's" to stages 316, 317 and 310. The division is achieved by the summation of the minimum count obtainable from the counter plus the number of counts subtracted as a result of the logical "1's" appearing at the control inputs of the selected control stages.

In summary then, the principle of operation of the control stages 311 through 318 is to inhibit one clock input from the preceding stage only once during each complete cycle of the entire counter. The result of this operation is to provide a maximum count of any counter of $2^n + 2^{n-1}$ where $n$ is equal to the number of counter stages.

For repetitive operation, a signal from the $\bar{Q}$ output of stage 309 resets stages 311 through 318 at the time $t_o + (2^n + 2^{n-1}) + t_d$ where the value of $(2^n + 2^{n-1})$ is dependent upon the control stages selected and $t_d$ is equal to the sum of the delays exhibited by the flip-flops in the counter. As illustrated in FIG. 6, this condition would occur at $t_o + 576$.

Stage 310 which is coupled to the output of stage 309 performs an additional division in the counter 116 for the purposes of obtaining a symmetrical output. That is, referring again to FIG. 6, line DD, it can be seen that the output of stage 309 lacks symmetry. The addition of stage 310 provides this symmetrical output which is coupled to the acquisition circuit 120 and phase comparator 122.

The operation of the phase comparator and acquisition circuit will now be described with references to FIGS. 4 and 5. First, however, it is necessary to consider how the inputs to these two circuits are obtained. Assume that the error signal into the VCO is a constant value and that the output frequency thereof is 216 megacycles. This signal is applied to the high speed tunnel diode counter 114, the output of which is 216 megacycles divided by 16, so that the input to the variable programmed counter 116 is a square wave pulse train at 13.5 megacycles. After being divided by 576 (assuming that count is selected), and then applied to the summetrical flip-flop 310, the output of the variable programmed counter will be at a frequency of 11.71875 kc. Similarly, the reference generator 124 is providing a stable output signal of 376 kc. which, divided by the reference counter 126 will similarly be 11.71875 kc. Accordingly, the signals appearing at the input to both the acquisition circuit and the phase comparator are of the same frequency.

As described previously, if the signals from the variable programmed counter 116 and the reference counter 126 are of the same frequency, the acquisition circuit 120 plays no role in maintaining the output frequency of the VCO constant. Accordingly, the operation of the phase comparator 122 will now be described with reference to FIG. 4 and the operation of the acquisition circuit 120 will be described hereinafter with reference to FIG. 5.

Referring now to FIG. 4, the output line 24 from the reference counter 126 is connected to a J input of a J-K flip-flop 402 and one input to each of two four-input NAND gates 404 and 406. The $\bar{Q}$ output from the variable programmed counter 116 is coupled to the K input of flip-flop 402 by conductor 18. This signal is also coupled to a second set of inputs in the NAND gates 404 and 406. A third input to NAND gate 404 is from the Q output of flip-flop 402 and the fourth input is coupled through a conductor 28 from the acquisition circuit 120. The third input to gate 406 is from the $\bar{Q}$ output of flip-flop 402 and the fourth input is from acquisition circuit 120 through a conductor 26. Since the signals into the phase comparator are of the same frequency, the signals appearing on conductors 26 and 28 are "0' s" for reasons to be described hereinafter with reference to FIG. 5.

The outputs of NAND gates 404 and 406 represent AND and NAND (inverted AND) outputs. The AND output of gate 404 is coupled to the emitter of a transistor 408 and the NAND output of this gate is connected to the base of this transistor. Conversely, the NAND output of gate 406 is connected to the emitter of a transistor 410 and the AND output of this gate is connected to the base of this transistor. The collectors of transistors 408 and 410 are respectively direct coupled to transistors 412 and 414. The collectors of these transistors are connected to a bias supply +V through a resistance and to an integrating capacitor 416 through diodes 418 and 420, respectively. The capacitor 416 is connected to the gate of a P-channel field effect transistor 422 with the source thereof connected to the bias supply and the drain thereof connected through a resistor to ground. The output of the comparator is derived from the drain of the field effect transistor and through conductor 30 is connected to the VCO.

Having thus described the arrangement of elements in the phase comparator, the operation thereof will now be described in conjunction with the timing wave shapes of FIGS. 7*a* and 7*b*. It should be noted that in actual operation of the phase comparator circuit, the phase comparison is performed only when the input signal from the reference counter 126 and the signal from the programmed counter 116 are separated by 180° with respect to each other as illustrated in FIG. *7a* and FIG. *7b*. Since the input signals are of the same frequency for the reasons described above, the only difference remaining is that of phase. Accordingly, assume that the reference signal appearing on line 24 is leading the counter output signal appearing on line 18 as illustrated in FIG. *7a*, lines FF and GG, respectively. Since the flip-flop 402 is triggered on the positive edge of a pulse, the Q output thereof will appear as illustrated in line HH of FIG. *7a* with the reference signal placing the Q output into the "0" state and the counter signal returning the Q output to "1" state. The three inputs to the NAND gate 404 and the logical "0" appearing on line 28 provide an output to the emitter of transistor 408 as illustrated in FIG. *7a*, line JJ. The signal appearing at the base of this transistor will be the inverse of this signal and, accordingly, transistor 408 is normally saturated and driven to cutoff during the logical "0" period. Similarly, transistor 412, which is also normally in saturation by virtue of the direct coupling to transistor 408, is also driven to cutoff during the "0" period. The signal appearing on the collector of transistor 412 will therefore be a positive going signal starting near ground potential and rising positively to the bias voltage for the duration of the signal appearing at the output of the NAND gate 404. This positive going signal is used to charge capacitor 416 through diode 418. The net charge developed on capacitor 416 is directly proportional to the phase difference existing between the reference signal and the counter signal; that is, the larger the phase difference, the wider the positive going pulse and hence the larger the integrated voltage. On the other hand, the closer the two signals are to synchronism, the narrower the positive going pulse and hence a smaller net charge.

During this same time interval, signals are being applied to NAND gate 406, however, since one of the three inputs is always in the logical "1" state, there is no output from this gate and hence no change in the cutoff conditions of transistors 410 and 414.

Consider now the situation in which the reference signal lags the counter output signal. This condition is illustrated in FIG. *7b*, lines FF' and GG', respectively. The $\overline{Q}$ output of flip-flop 402 under these conditions is illustrated in FIG. *7b*, line HH'. The three inputs to NAND gate 406 and the logical "0" from line 26 provide an output to the emitter of transistor 410 as illustrated in FIG. *7b*, line JJ'. This signal is a "0" at all times except when the three inputs are in their "0" condition. Since transistor 410 is normally cut off, a positive pulse appearing on the emitter will cause the transistor to saturate and create a positive going signal on its collector. This signal is directly coupled to the base of transistor 414 which is also normally off, but driven to saturation by the positive going signal and accordingly the collector of this transistor is driven from the bias potential, +V, to a near ground potential. During this interval, the charge on capacitor 416 is reduced by current flow through diode 420 and transistor 414. In a manner similar to that described previously, the capacitor is discharged for a period of time equal to the phase difference between the two signals. During this same time interval, the signals applied to NAND gate 404 are prevented from affecting the saturated condition of transistor 408 since one of the three inputs is always in the logical "1" state.

A slight change in the output frequency of the VCO is immediately detected by the phase comparator and in the aforementioned manner generates an error signal on capacitor 416 which is coupled by the field effect transistor to the input of the voltage controlled oscillator and maintains the output frequency of the VCO constant within the crystal accuracy of the reference signal.

Having thus described the operation of the phase comarator and its function when the input frequencies from the reference counter and the programmed counter are equal, it is now convenient to consider the situation when these two signals are not equal with reference to the function and operation of the acquisition circuit 120. Also to be described will be the interrelationship between the acquisition circuit and the phase comparator for performing the final locking operation.

Referring now to FIG. 5, the complementary outputs from the variable programmed counter 116 and the reference counter 126 are respectively coupled through conductors 18 and 24 to the respective J inputs of J-K flip-flops 502 and 504, similar to those described previously. The Q output of each flip-flop is coupled to its K input through delaying coils 506 and 508, respectively. The function of these coils is to receive the output pulse from the flip-flop and apply it back to the input a short time later for resetting the state of the flip-flop. By this technique, the bistable function of the flip-flop is modified in accordance with the time delay provided by coils 506 and 508; that is, the bistable flip-flops now function as monostable flip-flops with a pulse width output approximately equal to the delay introduced by the delaying coils. The $\overline{Q}$ outputs of flip-flops 502 and 504 are each coupled to one input of two-input NAND gates 510 and 512. The output of NAND gate 510 is coupled to the J input of a J-K flip-flop 514 as is the output of NAND gate 512 coupled to a J input of a J-K flip-flop 516. The K input of flip-flop 514 is coupled through a conductor 22 to the Q output of reference counter 126 and also to an input of a NAND gate 518. The K input of flip-flop 516 is coupled through a conductor 16 to the Q output of the variable programmed counter 116 and to an input of a NAND gate 520. The $\overline{Q}$ output of flip-flop 514 is connected to a second input of NAND gate 518 as is the Q output of flip-flop 516 coupled to a second input of NAND gate 520. A third input of NAND gate 518 is connected to conductor 18 and the third input of NAND gate 520 is connected to conductor 24. The output of NAND gate 518 is coupled to the K and J inputs of flip-flops 522 and 524, respectively. Similarly, the output of the NAND gate 520 is coupled to the K and J inputs of flip-flops 524 and 522, respectively. The $\overline{Q}$ output of flip-flop 522 is connected to a K input of flip-flop 524 and the $\overline{Q}$ output of flip-flop 524 is connected to a K input of flip-flop 522. The $\overline{Q}$ outputs of flip-flops 522 and 524 are respectively coupled through conductors 26 and 28 to the inputs of the phase comparator 122 for locking the phase comparator in a manner to be described hereinafter.

The operation of the acquisition circuit will now be described with reference to FIG. 8 which illustrates typical wave shapes associated with the embodiment of FIG. 5. Lines KK and LL of FIG. 8 respectively illustrate the output of the reference counter 126 and the output of the variable programmed counter 116. Assume that at time $t_o$, the system is locked at a particular output frequency and that at the time $t_1$ this frequency is changed by changing the count in the variable programmed counter 116 and that as a result thereof the output of the counter has a frequency lower than that of the reference counter. Accordingly, to provide the proper output frequency from the VCO at the newly selected frequency, a control signal must be generated to appropriately change the VCO operating frequency. This control or error signal is created by applying the output of the reference counter and the variable program counter to flip-flops 502 and 504 which provide a short negative-going pulse each time a positive-going edge is applied to its input. The outputs of flip-flops 502 and 504 are NAND-gated with each other to provide a positive-going output only during the coincidence of these signals as illustrated on lines MM and NN of FIG. 8. The frequency of coincidence is dependent upon the difference in frequency between the reference counter and the output of the variable programmed counter; that is, if the signals are of the same frequency and phase, then there is a coincidence each cycle. If, however, the output frequency of the variable programmed counter is less than that of the reference counter, the coincidence will occur at a rate less often than each cycle and dependent upon the frequency difference. In circuit operation, reference is made to the aforementioned description of the phase comparator where in the closed loop locked condition, the phase of the reference and programmed counter are separated by 180° with respect to each other. Therefore, during the locked condition, coincidence can not occur at any time and accordingly there will be no output from the NAND gates 510 and 512.

Accordingly, at periodic intervals the leading edges of the pulses from the reference counter and the programmed counter will coincide in both time and phase. This condition is illustrated in FIG. 8 at time $t_1$ on lines MM and NN, with the outputs of NAND gates 510 and 512 being positive pulses having a width equal to that determined by flip-flops 502 and 504. The outputs of NAND gates 510 and 512 are coupled to flip-flops 514 and 516. These signals cause the flip-flops to switch from their "1" state to their "0" state as illustrated in FIG. 8, lines PP and QQ. Both of the flip-flops were in their "1" stage as a result of signals applied at their K inputs as illustrated in FIG. 5. These flip-flops remain in their "0" state until their K inputs change state; that is, as the reference counter output changes from a "1" to a "0, " the reference counter complementary output causes flip-flop 514 to change from a "0" to a "1" as illustrated on lines $\overline{KK}$ and $\overline{LL}$ of FIG. 8. Similarly, as the output of the variable programmed counter changes from a "1" to a "0" the programmed counter complementary output causes the output of flip-flop 516 to change from a "0" to a "1." These conditions are illustrated in FIG. 8, lines PP and QQ at times $t_2$ and $t_3$.

The outputs of flip-flops 514 and 516 are applied to three-input NAND gates 518 and 520, respectively, along with signals from the variable programmed counter and the reference counter in the manner described above. Since NAND gate 518 has an input, three signals which during the period from $t_1$ to $t_3$ are in the "1" state, the output of the NAND gate during this interval is a "0" as illustrated in line RR of FIG. 8. On the other hand, the three signals applied to NAND gate 520 have a condition between times $t_2$ and $t_3$ in which the input switches to a "0." Accordingly, the output of this gate provides a "1" having a pulse width equal to the spacing between $t_2$ and $t_3$ as illustrated in line SS of FIG. 8.

The outputs of NAND gates 518 and 520 are coupled to the inputs of flip-flops 522 and 524 of the three position switch **120*b* as illustrated in FIG. 5. Flip-flops 522 and 524 perform a three position electronic switching function; that is, there are three combinations of outputs that are obtainable on conductors 26 and 28. These outputs are 0-0, 0-1 and 1-0. As pointed out above, at $t_0$ the system is locked and during this interval the output of flip-flops 522 and 524 is 0-0 as illustrated in FIG. 8, lines TT and UU respectively. At time $t_2$, NAND gate 520 provides an input signal to the J input of flip-flop 522 and to one of the K inputs of flip-flop 524. Since the $\overline{Q}$ output of both flip-flops 522 and 524 is at a "0" state, "1" input from NAND gate 520 will not disturb the output of flip-flop 522 whereas the output of flip-flop 524 will switch to the "1" condition as illustrated at time $t_2$ in line UU of FIG. 8. This "1" is coupled through conductor 28 to the input of NAND gate 404, as well as to one of the K inputs of flip-flop 522, as illustrated in FIGS. 4 and 5. A "1" in this gate will prevent an output signal therefrom and accordingly lock-out one portion of the phase comparator 122. During this condition, capacitor 416 will be discharged by pulses from NAND gate 406 in the manner previously described. Accordingly, the feedback voltage on conductor 30** will be increased and the output frequency of the VCO increased. In this way, the output frequency of the VCO is slewed toward the newly selected frequency.

The frequency of the VCO continues to increase until at some time $t_4$ when the frequency of the programmed counter is slightly higher than that of the reference counter. This condition is illustrated in FIG. 8 between times $t_4$ and $t_6$. As illustrated, at $t_4$ the reference counter and the programmed counter are again in coincidence in a manner as described previously, and NAND gates 510 and 512 and flip-flops 514 and 516 provide outputs as illustrated in lines MM, NN, PP and QQ, respectively. NAND gate 518, however, now provides a positive output between times $t_5$ and $t_6$ as illustrated in line RR of FIG. 8 whereas NAND gate 520 provides no output. Since flip-flop 522 has a "1" at its K input, the "1" provided by NAND gate 518 at the other K input has no effect on its output and remains at a "0". Flip-flop 524, however, switches from the "1" output state back to the "0" state as illustrated in line UU of FIG. 8. Accordingly, NAND gate 404 is no longer locked out. Therefore, the acquisition circuit 120 has performed its function of automatically changing the output frequency of the VCO to the newly selected frequency within the capture or lock-in range of the phase comparator 122 as previously described. The final correction or fine tuning control is then performed by the phase comparator. Automatic removal of the acquisition circuit is accomplished since no more pulses will be transmitted to flip-flops 522 and 524 as previously described above with reference to the phase comparator operation. Accordingly, at time $t_7$, the system is in synchronization and the output frequency of the VCO is maintained constant by the phase comparator.

It should be noted that the acquisition circuit 120 has no frequency response limitations but for the inherent limitations of the digital devices employed. Accordingly, high speed operation of the system is only limited by the slewing rate of the VCO. Additionally, the range or spectrum of frequencies attainable from this system are limited solely by the VCO frequency spectrum.

The aforedescribed operation illustrated the condition in which the output frequency of the variable programmed counter was less than that of the reference counter as a result of the newly selected frequency. Times $t_8$ through $t_{14}$ illustrate the condition in which the output frequency of the variable programmed counter is higher than the output frequency of the reference counter at the time of selection of the newly desired output frequency from the VCO. Circuit operation is substantially the same as just described with the sequence of operations appearing in the complementary circuitry. For example, a gate is now generated at the output of NAND gate 518 between times $t_9$ and $t_{10}$ whereas no gate is generated at the output of NAND gate 520. Similarly, flip-flop 522 is driven to the "1" state at time $t_9$ and provides a lock-out signal on conductor 26 which locks out the operation of NAND gate 406. In this way, the phase comparator provides only charging signals for capacitor 416 and hence the control signal created thereby will reduce the output frequency of the VCO. This condition exists until time $t_{12}$ at which time the frequency of the variable programmed counter is less than that of the reference counter and, accordingly, flip-flop 522 revers to the "0" state and the locking signal is removed from NAND gate 406. The acquisition circuit has therefore performed its function of changing the VCO output frequency to the newly selected frequency as described previously. The phase comparator 122 then performs the final frequency control as described previously.

In summary, the invention provides a digitally controlled frequency generator having a selectively variable output frequency with crystal controlled accuracy and stability and in which automatic frequency detection and slowing is provided by a novel arrangement of digital elements.

Obviously many modifications and variations of the present invention are possible in light of the above teachings. It is, therefore, to be understood that, within the scope of the appended claims, the invention may be practiced otherwise than as specifically described.

What is claimed is:

1. A circuit for providing an output signal proportional to the phase difference between two signals comprising:

a binary stage having first and second inputs for receiving said signals and first and second outputs in response thereto, said second output being the complement of said first output;

first and second gating means each having first and second inputs for receiving said signals and a third input for receiving the first output of said binary stage and the second output of said binary stage respectively; and said first gating means providing an output when the phase of said first input signal leads the phase of said second input signal and said second gating means providing an output when the phase of said second input signal leads the phase of said first input signal.

2. A circuit for providing an output signal proportional to the phase difference between two signals as recited in claim 1 further comprising:

means responsive to the outputs of said gating means for providing a signal having an amplitude and polarity equal to the phase difference between said signals.

3. A circuit as recited in claim 2 wherein said means for providing a signal comprises:

first amplifier means connected to said first gating means for providing a charging signal;

second amplifier means connected to said second gating means for providing a discharging signal;

integrator means receiving said charging and discharging signals and providing an output signal equal to the difference between said charging and discharging signals.

4. An electronic device comprising:

first and second binary elements each having first, second and third inputs and first outputs;

the first input of said first element connected to the second input of said second element and the first input of said second element connected to the second input of said first element;

the first output of said first element connected to the third input of said second element; and the first output of said second element connected to the third input of said first element whereby signal alternately applied at the first inputs of said elements provide an electronic switching operation.

5. A device for detecting a frequency difference between two input signals comprising:

coincidence means receiving said input signals and providing first and second outputs only during the coincidence of said input signals; and means providing first and second time gates in response to said coincidence means and complements of said input signals, said first and second time gates having pulse widths proportional to the difference in period between said input signals.

6. A device as recited in claim 5 wherein said coincidence means comprises:

first and second bistable devices proving output pulses in response to said input signals respectively; and first and second gating means each receiving the outputs of said bistable devices and providing an output only during the coincidence of said input signals.

7. A device as recited in claim 6 wherein said means providing first and second time gates comprises:

third and fourth bistable devices having inputs for receiving the signals from said first and second gating means and inputs for receiving the complements of said input signals;

said third and fourth bistable devices providing outputs having pulse widths proportional to said input signals; and third and fourth gating means receiving the outputs of said third and fourth bistable devices respectively, said input signals and the complements thereof for providing outputs therefrom having pulse widths equal to the difference between the pulses from said third and fourth bistable devices;

whereby said third gating means provides said first time gate when the period of one of said input signals is greater than that of the other input signal and said fourth gating means provides said second time gate when the periods of said signals are reversed.

* * * * *

UNITED STATES PATENT OFFICE
CERTIFICATE OF CORRECTION

Patent No. 3,688,202 Dated August 29, 1972

Inventor(s) Henry Naubereit et al

It is certified that error appears in the above-identified patent and that said Letters Patent are hereby corrected as shown below:

On the cover sheet, the inventor "Salvatore A. Picard" should read -- Salvatore R. Picard --. Column 14, line 54, "proving" should read -- providing --.

Signed and sealed this 13th day of February 1973.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334